3,277,009
WATER-SOLUBLE PACKAGE AND METHOD FOR MAKING AND USING SAME
Milton Freifeld, Easton, and Willis G. Thomas, Jr., Bethlehem, Pa., assignors to General Aniline & Film Corporation, New York, N.Y., a corporation of Delaware
No Drawing. Filed Oct. 3, 1961, Ser. No. 142,525
18 Claims. (Cl. 252—90)

This invention relates to a method of treating and/or handling solids and liquids intended to be dispersed in the form of a suspension, emulsion or solution in an aqueous medium and in particular to a method for packaging such solids and liquids and to the resultant treated solids and liquids and packages.

In very recent years the packaging of detergents in plastic envelopes or packages which are soluble in the wash water has become a very important adjunct of the packaging art. The advantages of such a package are manifest. Predetermined and pre-elected amounts of material can be added to the laundry bath which makes for a cleaner and altogether more desirable operation. Obviously there are many problems which must be solved to find the best package. The latter must of course be formed of a water-soluble material, again obviously this leaves for practical consideration only water-soluble polymers. Many come to mind as being potentially useful but all which have heretofore been proposed suffer from at least one or more deficiencies measured by their failure to meet the standards hereinafter to be described.

In order to find utility as a coating or in the packaging of solids and liquids, a water-soluble polymer must have certain properties. It must be capable of forming a continuous, homogeneous fim. Its solubility in water must be great enough to permit reasonable concentration of polymer in solution. Its rate of solution in water, both cold and hot, should be rapid. Its rate of solution and solubility in water should not be materially affected by the pH of the water. It should exhibit good stability on aging. Films or coatings formed from the polymer must have adequate physical strength to withstand manufacturing procedures and normal handling and use abuses. They must have low tack and show only minor blocking tendencies. They must be able to withstand low and high humidity conditions without major loss of physical strength. They must be able to withstand low and moderately high temperature without loss of requisite properties. They must not be attacked and in turn must not attack the materials which they envelop or contain.

It is therefore an object of the present invention to provide a method for coating, packaging and/or otherwise treating solid and liquid materials to facilitate their handling in an aqueous medium.

It is another object of this invention to provide a method for coating, encasing, packaging and/or otherwise treating solids and liquids with water-soluble film-forming materials.

It is still another object of this invention to provide a method for coating or packaging solids and liquids with water-soluble film-forming polymers.

It is still another further object of the present invention to provide treated solids and liquids to facilitate their handling for use in an aqueous medium.

It is a further object of this invention to provide protectively coated solids.

It is still another object of the present invention to provide a packaged solid or liquid which is adapted for use in aqueous systems whereby the package dissolves in said aqueous medium to dispense the said solid or liquid.

Other objects will appear hereinafter as the description proceeds.

It has been discovered that N-alkoxymethyl polypyrrolidone and N-alkthiomethyl polypyrrolidone in which from about 14% to about 22% of the amide nitrogen atoms are substituted by N-alkoxymethyl or N-alkthiomethyl groups, respectively, are admirably suited for the purposes and ends above described, and that such polymers are far superior to all others for such purposes as packaging and the like having the optimum in the necessary and desired characteristics listed above.

The N-alkoxymethyl polypyrrolidones differ markedly from the N-alkoxymethyl derivatives of nylon 6, nylon 6—6, and nylon 6–10 in that they are water soluble while the nylon based compounds are not. In addition the N-alkoxymethyl polypyrrolidones exhibit advantages over other polymers suitable for water-soluble films or coatings such as polyvinyl alcohol, ethoxylated polyvinyl alcohol, the alkyl celluloses, the hydroxyalkyl celluloses, gelatin, and starch. In most cases these polymers must be externally plasticized by addition of water-soluble compounds such as glycerin in order to obtain satisfactory properties. The water-soluble plasticizer tends to migrate and also increase sensitivity to water vapor and in time moisture pick-up becomes so great that the film or coating fails as a protective barrier. The N-alkoxymethyl polypyrrolidones are internally plasticized with no migration possible and moisture sensitivity can be regulated by the percent of nitrogen substitution. Ethoxylated polyvinyl alcohol and polyvinyl alcohol are very slowly soluble in water at or below 77° F.; methyl cellulose shows greater rate of solution in cold water than in hot; the N-alkoxymethyl polyrrolidones have a high rate of solution in either cold or hot water. Films cast from N-alkoxymethyl polypyrrolidones within the useful range of nitrogen substitution have physical strength properties comparable to polyvinyl alcohol or ethoxylated polyvinyl alcohol films, and far higher elongation than that reported for methyl cellulose film. The N-alkoxymethyl polypyrrolidone films are less affected by relative humidities over 50% than polyvinyl alcohol or ethoxylated polyvinyl alcohol films and exhibit less embrittlement at low temperatures. The rate of solution of polyvinyl alcohol and ethoxylated polyvinyl alcohol films in water decreases drastically at pH 8 or higher; the N-alkoxymethyl polypyrrolidone films do not show any change in rate of solution with change in pH. Polyvinyl alcohol and ethoxylated polyvinyl alcohol water solutions have higher viscosities than equivalent concentration solutions of N-alkoxymethyl polypyrrolidones. Polyvinyl alcohol and ethoxylate polyvinyl alcohol can not be heated above 200° F., because of crosslinking at higher temperatures. N-alkoxymethyl polypyrrolidone can be heated to 185° C. without materially affecting properties.

What has been stated above with respect to the N-alkoxymethyl polypyrrolidones applies to the N-alkthiomethyl polypyrrolidones, too, of course.

The compounds which are contemplated for use in the present invention are derived from polypyrrolidone by the substitution of from about 14% to about 22% of the amide nitrogen atoms by a group of the formula:

wherein A is oxygen or sulfur and R is methyl or ethyl.

The general method for the preparation of such derivatives is fully described in copending application Serial No. 853,693, filed Nov. 18, 1959, now abandoned and the disclosure of that application relating to the compounds herein contemplated and the methods for making same is hereby incorporated by reference thereto.

While the immediate and most advantageous use of the compounds with which this invention is concerned lies in the packaging of detergents and similar products, it is equally clear that protective coatings of a temporary nature may be applied to any solid or used to encapsulate any liquid in any of the well-known and conventional methods. Thus a solution of the polymer may be applied directly to an article, material, compound or the like by brushing, dipping, spraying, roller coating, etc., followed by a conventional air drying or baking to remove the solvent. Alternatively, unsupported films of the polymer may be prepared, again, in the conventional ways for so doing, which films can be sealed by heat, solvent, adhesive or the like to form packages in which the aforementioned items are enclosed.

The following examples will serve to illustrate the present invention without being deemed limitative thereof. Parts are by weight unless otherwise indicated.

EXAMPLE 1

A 20% solution of N-methoxymethyl polypyrrolidone (prepared from polypyrrolidone having a relative viscosity of 2.5) and a nitrogen substitution of 14.5% is prepared in 50–50 water-methanol. The pH of the solution is 7.71 and the viscosity is 240 cps. Films are then cast from this freshly made solution on Mylar covered glass plates and (1) baked at 140° C. for 20 minutes and (2) air dried. The films are then conditioned at 20% relative humidity and 77° F. for 2, 14 and 28 days and tensile strength and elongation are measured employing a crosshead speed of 20 inches per minute on an Instron tester. Similiar films are made and conditioned from similar solutions which have been aged for 26 days. The results appear in Table I.

*Table I*

| Solution | Film-drying Conditions | 2 Day Conditioned | | 14 Day Conditioned | | 28 Day Conditioned | |
|---|---|---|---|---|---|---|---|
| | | Tensile (p.s.i.) | Percent Elong. | Tensile (p.s.i.) | Percent Elong. | Tensile (p.s.i.) | Percent Elong. |
| Fresh | Air | 4,390 | 288.5 | 3,970 | 260.5 | 4,850 | 321 |
| Do | 140° C.—20 min | 3,310 | 56 | 3,390 | 188.5 | 3,270 | 212.5 |
| Aged | Air | 4,420 | 271 | 4,150 | 222 | 4,930 | 293 |
| Do | 140° C.—20 min | 3,790 | 251.5 | 4,490 | 215 | 4,020 | 261.5 |

EXAMPLE 2

Example 1 is repeated except that the percent nitrogen substitution is 21.8%. This polymer is made up to a 20.8% solution and has a pH of 7.65 and a viscosity of 297 cps. Results appear in Table II.

*Table II*

| Solution | Film-drying Conditions | 2 Day Conditioned | | 14 Day Conditioned | | 28 Day Conditioned | |
|---|---|---|---|---|---|---|---|
| | | Tensile (p.s.i.) | Percent Elong. | Tensile (p.s.i.) | Percent Elong. | Tensile (p.s.i.) | Percent Elong. |
| Fresh | Air | 3,020 | 391.5 | 2,530 | 293 | 2,910 | 389.5 |
| Do | 140° C.—20 min | 3,270 | 379.5 | 3,760 | 395 | 2,150 | 327 |
| Aged | Air | 2,830 | 320 | 3,090 | 226 | 3,080 | 346 |
| Do | 140° C.—20 min | 3,370 | 358.5 | 2,540 | 211 | 2,890 | 386 |

EXAMPLE 3

Films are cast as in above examples from 20% by weight solutions in 50/50 methanol-water, baked for 20 minutes at 140° C. and conditioned for 2 days at 50% relative humidity and 77° F. Elmendorf tear strength is determined. The polypyrrolidone used has a relative viscosity of 2.5.

Percent N substitution of polymer: Tear strength (g./mil)
14.5 _____ 184.8
15 _____ 263.6
17 _____ 357.9
18.8 _____ 362.1
21.8 _____ 533.9

EXAMPLE 4

Films are prepared of 1.7–2.0 mils thickness from solutions containing 20% by weight of N-methoxymethyl polypyrrolidone having nitrogen substitutions of 14.5 and 15% and compared with similar films from 20% solutions of ethoxylated polyvinyl alcohol for blocking characteristics by placing two pieces of each film face to face subjected to a weight of 500 g./sq. in. in 75% and 98% relative humidity atmospheres. After 24 hours the films are peeled apart and any blocking is noted. The visual appearance of the films is also noted.

| Polymer | Relative Humidity, Percent | Blocking | Visual Appearance |
|---|---|---|---|
| 14.5% N-sub | 75 | Very slight | Soft, tender, no wrinkling. |
| 15% N-sub | 75 | do | Do. |
| Ethoxylated polyvinyl alcohol | 75 | Severe | Soft, tender, wrinkled. |
| 14.5% N-sub | 98 | Slight | Soft, tender, some wrinkling. |
| 15% N-sub | 98 | do | Do. |
| Ethoxylated polyvinyl alcohol | 98 | Complete | Film going into solution. |

EXAMPLE 5

1-inch x 2-inch strips of films 1.7–1.9 mils thick from solutions of (A) 14.5% nitrogen substituted polymer, (B) 21.8% nitrogen substituted, and (C) ethoxylated polyvinyl alcohol are added to 100 ml. portions of water buffered to pH's of 1, 2, 3, 4, 5, 6, 7, 8, 9 and 10. The speed with which the film is attacked, time to effect complete solution or disintegration and presence of residue is noted. The results appear below in Table III.

Table III

| Polymer | pH | Speed of Attack by Water | Time to Complete Soln. or Disinteg. (sec.) | Residue |
|---|---|---|---|---|
| A | 1 | Immediate | 20 | Slight. |
| A | 2 | ----do---- | 25 | Do. |
| A | 3 | ----do---- | 16 | Do. |
| A | 4 | ----do---- | 22 | Do. |
| A | 5 | ----do---- | 18 | Do. |
| A | 6 | ----do---- | 20 | Do. |
| A | 7 | ----do---- | 22 | Do. |
| A | 8 | ----do---- | 20 | Do. |
| A | 9 | ----do---- | 18 | Do. |
| A | 10 | ----do---- | 14 | Do. |
| B | 1 | ----do---- | 10 | None. |
| B | 2 | ----do---- | 13 | Do. |
| B | 3 | ----do---- | 13 | Do. |
| B | 4 | ----do---- | 11 | Do. |
| B | 5 | ----do---- | 11 | Do. |
| B | 6 | ----do---- | 13 | Do. |
| B | 7 | ----do---- | 14 | Do. |
| B | 8 | ----do---- | 12 | Do. |
| B | 9 | ----do---- | 9 | Do. |
| B | 10 | ----do---- | 10 | Do. |
| C | 1 | ----do---- | 120 | Do. |
| C | 2 | ----do---- | 147 | Do. |
| C | 3 | ----do---- | 155 | Do. |
| C | 4 | ----do---- | 110 | Do. |
| C | 5 | ----do---- | 115 | Do. |
| C | 6 | ----do---- | 178 | Do. |
| C | 7 | ----do---- | 165 | Do. |
| C | 8 | ----do---- | (¹) | Film swollen but intact. |
| C | 9 | ----do---- | (¹) | Do. |
| C | 10 | ----do---- | (¹) | Do. |

¹ 24 hours.

From the above table it is quite evident that the films of the present invention are far superior to ethoxylated polyvinyl alcohol and especially so under slightly alkaline conditions.

EXAMPLE 6

In this example the low temperature properties of the instant compositions are compared with ethoxylated polyvinyl alcohol (C). The 14.5% nitrogen substituted polymer (A) and the 21.8% nitrogen substituted polymer (B) of Example 5 are used again. 1.7 to 1.9 mil thick film are conditioned at 0° C. and −78.5° C. and are then subjected to a rapid crumpling stress at these temperatures. The conditioning is carried out by immersing a sealed glass jar containing the film for 3 hours in either an ice-water bath (0° C.) or crushed Dry Ice (−78.5° C.). The results are given in Table IV.

Table IV

| Polymer | 0° C. | −78.5° C. |
|---|---|---|
| A | Film intact | Film intact. |
| B | ----do---- | Do. |
| C | ----do---- | Film breaks into pieces. |

EXAMPLE 7

Detergent packages are prepared from two thicknesses (each 1.7–2.0 mils) of films from polymers A, B and C above by heat sealing along three edges, filling the packages with detergent and finally heat sealing the fourth edge. The heat sealing is done with a Sealine hand sealer which consists of an electrically heated Teflon coated metal wheel with corrugated ⅛ inch wide rim axially mounted for free rotation. The detergent used is of the following composition:

| | Percent |
|---|---|
| Sodium dodecyl benzene sulfonate | 34 |
| Sodium tripolyphosphate | 40 |
| Sodium silicate | 7 |
| Sodium carboxy methyl cellulose | 0.5 |
| Optical brighteners | 0.07 |
| Sodium sulphate | Bal. |

Each package is prepared containing 10 g. of above detergent composition. The packages are placed in 500 ml. of water at 70° F. Packages made of polymers A and B release the contents within 15 seconds. Packages of polymer C require 10 minutes for such release.

EXAMPLE 8

Polymer A and polymer C as packages for 120 g. of the above described detergent are tested for soil redeposition and cleaning properties for a laundering cycle.

For each run a Dexter top loading washing machine is filled with 10 gallons of water at 120° F. and 130 grams of screened hotel vacuum cleaner dust added. Then either 120 grams of detergent, 120 grams of detergent packaged in polymer film A, or 120 grams of detergent packaged in polymer film C is added and agitation carried out for 1 minute. (Both film packages are of equivalent size and film thickness.) 20 pieces of 36 in. clean, dry cotton sheeting 3 pieces of 8 in. x 8 in. Indianhead cloth, and 4 1½ in. x 4 in. swatches of each of the following standard materials—American Conditioning House, Standard U.S. Testing, and Test fabric—are added. The full load is agitated for 20 minutes. The standard soiled materials and Indianhead cloth swatches are removed, wrung dry by hand, rinsed in 1 liter of water at 100° F. for 5 minutes, wrung dry by hand, and dried on an aluminum plate heated by a steam bath.

A model 610 Photovolt Corp. photometer with a tritimulus green filter on the search is calibrated to give a reading of 86 with a standard white ceramic plate. The reflectances of each piece of the soiled materials and Indianhead cloth are determined on a gray cardboard background. In all cases reflectances are taken using uniform thicknesses of cloth. The indivdual readings for each type of soiled material are averaged and an overall average of the three types of soiled material obtained. Cleaning power is reported as this overall average and soil redeposition as the average of the Indianhead cloth readings. The higher the value, the greater the cleaning power and the less soil redeposition. The results are as follows:

DETERGENT (NO PACKAGE)

| Test Swatch | Readings | Average | Cleaning Power | Soil Redeposition Value |
|---|---|---|---|---|
| American Cond. House | 45 47 47 48 | 46.75 | 44.16 | |
| Test fabric | 45 46 45 42 | 44.5 | | |
| Stand. U.S. Testing | 42 42 42 39 | 41.25 | | |
| Indianhead cloth | 79.3 80 79.4 | 79.52 | | 79.52 |

DETERGENT PACKAGED IN POLYMER FILM A

| Test Swatch | Readings | Average | Cleaning Power | Soil Redeposition Value |
|---|---|---|---|---|
| American Cond. House | 44 46 45 44 | 44.75 | 42.0 | |
| Test fabric | 39 42 38 39 | 39.5 | | |
| Stand. U.S. Testing | 43 41 40 43 | 41.75 | | |
| Indianhead cloth | 78 78.1 78.3 | 78.11 | | 78.11 |

DETERGENT IN POLYMER FILM C

| Test Swatch | Readings | Average | Cleaning Power | Soil Redeposition Value |
|---|---|---|---|---|
| American Cond. House | 44 44 43 44 | 43.75 | 40.5 | |
| Test fabric | 38 34 36 38 | 37.75 | | |
| Standard U.S. Testing | 41 40 41 38 | 40.0 | | |
| Indianhead cloth | 77.3 77.1 76.4 | 76.91 | | 76.91 |

From the above data it is evident that in addition to superior dissolution characteristics as well as outstandingly better physical properties described above, better cleaning and redeposition characteristics are obtained with the instant pacakges as compared to packaging with ethoxylated polyvinyl alcohol.

EXAMPLE 9

Packages are prepared as in Example 8 except that the contents are varied as follows:
(A) Soap powder
(B) Urea pellets
(C) Phenyl mercuric acetate
(D) Sugar
(E) DDT containing 50% by weight of Tamol NNO dispersing agent
(F) 13% chlorinated copper phthalocyanine pigment containing 20% by weight of sodium lauryl sulfate
(G) Chlordane powder
(H) Instant coffee
(I) Aspirin
(J) Dehydrated potato
(K) Gasoline
(L) Carbon tetrachloride
(M) Penicillin, potassium

EXAMPLE 10

A 20% by weight solution of 14.5% nitrogen substituted product (Polymer A) in 50/50 by weight mixture of methanol and water is prepared. Paper is coated by a roller coating technique to give a film on one side of the paper. After drying, the coated paper shows excellent grease and oil resistance and imperviousness.

EXAMPLE 11

A package of polymer A is prepared as above containing cottonseed oil. There is no evidence of oil loss or permeability after 90 days storage at 100° F.

EXAMPLE 12

Examples 8–11 are repeated employing N-methoxy methyl polypyrrolidone with the following nitrogen substitution values.

A. 15%     D. 20%
B. 17%     E. 21.8%
C. 18.8%   F. 22%

Excellent results are obtained in each instance.

EXAMPLE 13

Example 12 is repeated employing the following polypyrrolidone derivatives:
A. N-meththiomethyl—14% nitrogen substitution
B. N-meththiomethyl—16% nitrogen substitution
C. N-meththiomethyl—22% nitrogen substitution
D. N-ethoxymethyl—14.2% nitrogen substitution
E. N-ethoxymethyl—21.6% nitrogen substitution
F. N-eththiomethyl—15% nitrogen substitution
G. N-eththiomethyl—21% nitrogen substitution Similar excellent results are obtained as in the previous examples. The polypyrrolidone employed to prepare the derivatives described in Examples 4–13 has a relative viscosity of 2.5.

EXAMPLE 14

Examples 7 through 13 are repeated employing polypyrrolidones of the following viscosity grades:

A. 1.5      F. 10.0
B. 2.2      G. 12.5
C. 2.3      H. 22.5
D. 3.0      I. 25.0
E. 5.0

The polypyrrolidones used in the preparation of the derivatives herein described as set forth in copending application Serial No. 853,693 mentioned above may be of any viscosity grade and suitably between 1.5 and 25 (relative viscosity—measured as a 1% solution in m-cresol).

Other variations in and modifications of the described processes which will be obvious to those skilled in the art can be made in this invention without departing from the scope or spirit thereof.

We claim:
1. In a method for packaging substantially water-free solids and liquids in a solid, film-forming material, the improvement which comprises employing as the film-forming material polypyrrolidone containing from about 14% to about 22% substitution of the nitrogen atoms by a group of the formula —CH$_2$AR wherein A is selected from the group consisting of exygen and sulphur and R is selected from the group consisting of methyl and ethyl.
2. A method as defined in claim 1 wherein A is oxygen and R is methyl.
3. A method as defined in claim 1 wherein A is oxygen and R is ethyl.
4. A method as defined in claim 1 wherein A is sulphur and R is methyl.
5. A method as defined in claim 1 wherein A is sulphur and R is ethyl.
6. In a method for packaging a solid detergent composition substantially free of water in an envelope, the improvement which comprises employing as the envelope a water-soluble polypyrrolidone derivative, said derivative containing from about 14% to about 22% of the nitrogen atoms of the polypyrrolidone substituted with a substituent selected from the group consisting of methoxymethyl, ethoxymethyl, methiomethyl and ethiomethyl.
7. In a method as defined in claim 6 wherein the substituent on the polypyrrolidone is methoxy methyl.
8. In a method as defined in claim 6 wherein the substituent on the polypyrrolidone is ethoxy methyl.
9. In a method as defined in claim 6 wherein the substituent on the polypyrrolidone is methiomethyl.
10. In a method as defined in claim 6 wherein the substituent on the polypyrrolidone is ethiomethyl.
11. A method for packaging substantially water-free solids and liquid materials which comprises enveloping said material with a polypyrrolidone film-forming derivative, said derivative containing from about 14% to about 22% of the nitrogen atoms of the polypyrrolidone substituted with a substituent selected from the group consisting of methoxymethyl, ethoxymethyl, methiomethyl, and ethiomethyl.
12. A method as defined in claim 11 wherein the polypyrrolidone contains about 21.8% of the nitrogen atoms substituted with methoxy methyl groups.

13. A method as defined in claim 11 wherein the polypyrolidone contains about 21.8% of the nitrogen atoms substituted with methoxy methyl groups.

14. A method for producing a water-removable, grease and oil resistant coating on a base which comprises applying to said base an aqueous solution of polypyrrolidone containing from about 14% to about 22% of the nitrogen atoms substituted with a grouping selected from the group consisting of methoxymethyl, ethoxymethyl, methiomethyl and ethiomethyl groupings and drying the coating.

15. A method as defined in claim 14 wherein the base is a paper base.

16. A method as defined in claim 15 wherein the grouping is methoxymethyl.

17. A package consisting essentially of a water-free detergent material in an envelope of a water-soluble polypyrrolidone derivative, said derivative containing from about 14% to about 22% of the nitrogen atoms substituted with a grouping selected from the group consisting of methoxymethyl, ethoxymethyl, methiomethyl and ethiomethyl groupings.

18. A package as defined in claim 17 wherein the envelope is polypyrrolidone and the substituent grouping is methoxymethyl.

References Cited by the Examiner

UNITED STATES PATENTS

| | | | |
|---|---|---|---|
| 1,780,375 | 11/1930 | Bradley | 117—155 |
| 2,086,903 | 7/1937 | Ellis | 117—155 |
| 2,734,004 | 2/1956 | Robinson | 117—139.5 |
| 3,000,830 | 9/1961 | Fong et al. | 252—117 |
| 3,055,834 | 9/1962 | Charle et al. | 252—90 |
| 3,061,549 | 10/1962 | Dickey | 252—90 |
| 3,113,674 | 12/1963 | Kiefer et al. | 252—90 XR |

FOREIGN PATENTS 451,839   10/1948   Canada.

OTHER REFERENCES

Carns et al.: Preparation and Properties of N-Methylol, N-Alkoxymethyl and N-Alkylthiomethyl Polyamides, pp. 651–657 relied on, vol. 71, Journal of American Chem. Society (1949).

Haas et al.: "Hydroxyethyl Nylon," Journal of Polymer Science, vol. 15 (1955), pp. 427–429 and 437–443.

LEON D. ROSDOL, *Primary Examiner.*

JULIUS GREENWALD, *Examiner.*

A. T. MEYERS, W. E. SCHULZ, *Assistant Examiners.*